United States Patent
Buannic et al.

(10) Patent No.: US 9,559,357 B2
(45) Date of Patent: Jan. 31, 2017

(54) METHOD FOR PREPARING A TITANIUM AND NIOBIUM MIXED OXIDE BY SOLVOTHERMAL TREATMENT; ELECTRODE AND LITHIUM ACCUMULATOR COMPRISING SAID MIXED OXIDE

(71) Applicant: Commissariat A L'Energie Atomique Et Aux Energies Alternatives, Paris (FR)

(72) Inventors: Lucienne Buannic, Sassenage (FR); Jean-François Colin, Meylan (FR); Lise Daniel, Saint Marcellin (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 35 days.

(21) Appl. No.: 14/666,620

(22) Filed: Mar. 24, 2015

(65) Prior Publication Data

US 2015/0221939 A1    Aug. 6, 2015

Related U.S. Application Data

(63) Continuation of application No. PCT/FR2013/052099, filed on Sep. 12, 2013.

(30) Foreign Application Priority Data

Oct. 17, 2012    (FR) ...................................... 12 59881

(51) Int. Cl.
| | | |
|---|---|---|
| *H01M 4/485* | (2010.01) | |
| *C01G 33/00* | (2006.01) | |
| *H01M 10/052* | (2010.01) | |
| *B82Y 30/00* | (2011.01) | |
| *H01M 4/04* | (2006.01) | |

(52) U.S. Cl.
CPC .............. *H01M 4/485* (2013.01); *B82Y 30/00* (2013.01); *C01G 33/00* (2013.01); *C01G 33/006* (2013.01); *H01M 4/0471* (2013.01); *H01M 10/052* (2013.01); *C01P 2004/03* (2013.01); *C01P 2004/51* (2013.01); *C01P 2004/53* (2013.01); *C01P 2004/62* (2013.01); *C01P 2004/64* (2013.01); *C01P 2006/12* (2013.01); *C01P 2006/40* (2013.01); *H01M 2220/20* (2013.01); *H01M 2220/30* (2013.01); *Y02E 60/122* (2013.01); *Y10T 428/2982* (2015.01)

(58) Field of Classification Search
CPC .. H01M 10/052; H01M 4/485; H01M 4/0471; C01G 33/00; C01G 33/006; B82Y 30/00; Y10T 428/2982
USPC ........................ 428/402; 423/598; 429/231.5
See application file for complete search history.

(56) References Cited

U.S. PATENT DOCUMENTS

| | | | |
|---|---|---|---|
| 9,359,220 B2* | 6/2016 | Simonin | ................ H01M 4/131 |
| 2012/0052401 A1* | 3/2012 | Goodenough | ......... C01G 33/00 |
| | | | 429/341 |

FOREIGN PATENT DOCUMENTS

| | | | |
|---|---|---|---|
| EP | 2 327 663 A1 | | 6/2011 |
| EP | 2327663 | * | 6/2011 |
| JP | 2010-287496 A | | 12/2010 |
| JP | 2010287496 | * | 12/2010 |
| WO | 2012/016185 A2 | | 2/2012 |
| WO | WO2012/016185 | * | 2/2012 |

OTHER PUBLICATIONS

International Search Report, International Application No. PCT/FR2013/052099, dated Dec. 17, 2013 (2 pages).

* cited by examiner

*Primary Examiner* — Leszek Kiliman
(74) *Attorney, Agent, or Firm* — Burr & Brown, PLLC

(57) ABSTRACT

A method of preparing a titanium and niobium mixed oxide including the steps of: preparing a titanium and niobium mixed oxide in amorphous form by a solvothermal treatment of at least one titanium precursor and of at least one niobium precursor, mechanically crushing the titanium and niobium mixed oxide obtained at the end of the solvothermal treatment and calcinating the mixed oxide obtained after crushing.

16 Claims, 3 Drawing Sheets

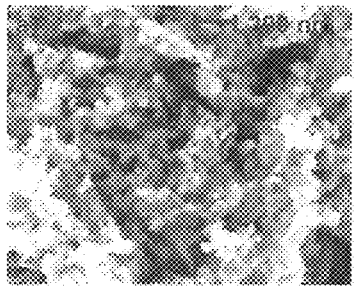
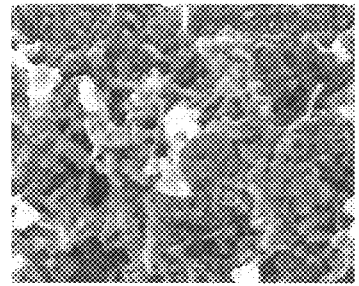
Fig. 1a    Fig. 1b
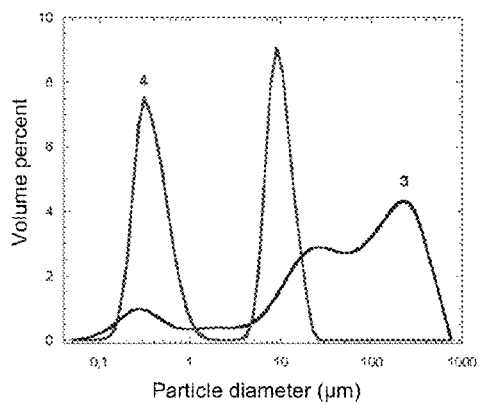
Fig. 1c
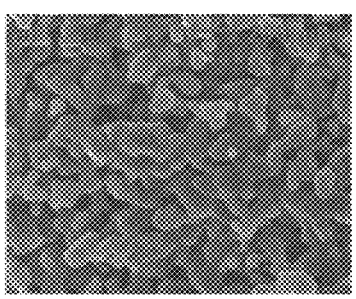
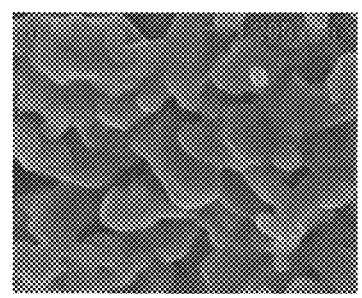
Fig. 2a    Fig. 2b

METHOD FOR PREPARING A TITANIUM AND NIOBIUM MIXED OXIDE BY SOLVOTHERMAL TREATMENT; ELECTRODE AND LITHIUM ACCUMULATOR COMPRISING SAID MIXED OXIDE

BACKGROUND OF THE INVENTION

Field of the Invention

The invention relates to a method of preparing a titanium and niobium mixed oxide. It also relates to an electrode based on this mixed oxide as well as to a lithium accumulator comprising said electrode.

The field of use of the invention particularly relates to the storage of electric power, be it particularly for portable electronic devices, for hybrid or all-electric cars, but also for the storage of the power originating from photovoltaic cells.

Description of Related Art

The electric energy storage capacity of accumulators, be they of nickel-cadmium (Ni—Cd) and nickel-metal hydride (Ni-MH) or lithium type, provides a significant energy self-sufficiency for the user of electronic devices.

The optimization of such accumulators particularly requires improving their energy density, in other words, a capacity of storing energy per volume and mass unit. In this respect, lithium accumulators are increasingly used, particularly in the field of portable devices, given that their mass and volume energy densities are generally greater than those of Ni—Cd and Ni-MH accumulators.

For example, Li-ion accumulators having an energy density in the order of 200 Wh/kg have been developed. As a comparison, Ni—Cd and Ni-MH accumulators do not exceed 50 and 100 Wh/kg, respectively.

The optimization of such accumulators has also caused the development and the use of new electrode materials.

In the case of the active material of a positive electrode of a lithium accumulator available for sale, it may be a lamellar compound such as $LiCoO_2$, $LiNiO_2$, and mixed compounds $Li(Ni, Co, Mn, Al)O_2$, or a compound having a spinel structure with a composition close to that of $LiMn_2O_4$.

However, the active material of the negative electrode generally is carbon (graphite, coke . . . ), the $Li_4Ti_5O_{12}$ spinel, or a metal forming an alloy with lithium (Sn, Si, . . . ). The theoretical and practical specific capacities of graphite and titanium oxide negative electrode compounds respectively are approximately 370 mAh/g and 170 mAh/g.

Although it has a lower capacity than graphite, compound $Li_4Ti_5O_{12}$ has certain advantages, particularly regarding (i) its high working potential, approximately 1.6 V, which makes it very safe, and (ii) a very good high-rate cyclability.

Other materials have been developed, particularly niobium oxides and titanium and niobium mixed oxides. Niobium indeed has a working potential close to that of titanium. It further enables to exchange 2 electrons per metal ($Nb^{5+}+2\ e^- \leftrightarrow Nb^{3+}$).

Among titanium and niobium mixed oxides, $ATiNbO_5$ types (A=H, Li) lamellar oxides, and also $Ti_2Nb_2O_9$, $TiNb_2O_7$, and $Ti_2Nb_{10}O_{29}$, can be mentioned. Some of these compounds have capacities in the order of 250 mAh/g. However, some of these oxides may have the disadvantage of not providing the reversibility necessary to exchanges inherent to lithium accumulators.

Further, the capacity of some of these mixed oxides drastically decreases at a high rate. A niobium doping and a carbon coating may attenuate or even cancel this loss of capacity. However, such techniques require specific experimental conditions particularly difficult to envisage at an industrial scale (vacuum, inert atmosphere).

To overcome these disadvantages, the synthesis of $TiNb_2O_7$ by a sol-gel process has been developed. Now, this method previously implies using hydrofluoric acid. Further, although the low-rate performance of the $TiNb_2O_7$ compound reaches 280 mAh/g, capacities decrease on use thereof at high rate.

Other syntheses have been developed, particularly that of $Ti_{0.9}Nb_{2.1}O_7$ by a solid process. This material, when coated with carbon, has a capacity of 190 mAh/g at 9 C, that is, 67% of the low-rate capacity. However, such a synthesis also requires constraining experimental conditions (vacuum and inert atmosphere) for the niobium doping and coating steps.

The Applicant has developed a process of titanium and niobium mixed oxide synthesis which requires no experimental conditions such as the creation of vacuum or an inert atmosphere.

The invention thus enables to rapidly prepare a titanium and niobium mixed oxide material having a high-rate behavior improved over prior art oxides.

SUMMARY OF THE INVENTION

The Applicant has developed a method enabling to prepare a titanium and niobium mixed oxide, while requiring little energy as compared with prior art methods. Further, this method enables to optimize the properties of the mixed oxide thus obtained, and also the electrochemical performance of accumulators containing said mixed oxide.

This method particularly comprises a solvothermal synthesis implementing precursors based on titanium and niobium. Such a solvothermal treatment enables to keep a low calcination temperature promoting ion conductivity. The method according to the invention requires no specific atmosphere.

More specifically, the present invention relates to a method of preparing a titanium and niobium mixed oxide comprising the steps of:

preparing a titanium and niobium mixed oxide in amorphous form by a solvothermal treatment of at least one titanium precursor and of at least one niobium precursor;

mechanically crushing the titanium and niobium mixed oxide obtained at the end of the solvothermal treatment;

calcinating the mixed oxide obtained after mechanical crushing.

The titanium and niobium mixed oxide thus obtained preferentially corresponds to formula $Ti_xNb_{2y}O_{(2x+5y)}$ (or x $TiO_2$+y $Nb_2O_5$), x being in the range from 1 to 2 and y being in the range from 1 to 12, where x and y are not necessarily integers, even if they are preferably integers.

Solvothermal Treatment:

Generally, the solvothermal treatment comprises the steps of:

bringing the titanium and niobium precursors into solution;

precipitating the precursors;

thermally treating, under pressure, the precipitated precursors thus obtained.

The bringing of the precursors into solution is advantageously performed in an alcohol, such as ethanol. As a variation, other alcohols may be used, such as isopropanol, butanol, or even glycols.

The precursors are advantageously solubilized in the same solution to form a homogeneous mixture.

The precipitation of the mixture thus obtained may be performed by adjustment of the pH, advantageously to approximately 10. This step may advantageously be implemented by adding ammonia.

The precipitation of the precursor mixture may result in a paste.

Generally, the solvothermal treatment to which the mixture of precipitated precursors is submitted may be carried out at a temperature in the range from 200 to 250° C., advantageously in the order of 220° C.

The temperature increase may correspond to a gradient in the range from 1 to 5° C./min, advantageously 2° C./min.

On the other hand, the cooling ramp may advantageously be in the range from 1 to 10° C./min, advantageously 5° C./min.

The duration of the solvothermal treatment may be in the range from 2 to 10 hours, advantageously in the order of 5 hours. Generally, the treatment time does not comprise the time necessary to heat up and to cool down the mixture.

However, the conditions may depend on the quantity of material to be treated.

According to a preferred embodiment, the solvothermal treatment is implemented in a hydrothermal pressure vessel (reactor, autoclave) to perform a thermal treatment under pressure. The "dead" volume in the container (generally made of polytetrafluoroethylene (Teflon®)) may advantageously amount to two thirds of the total volume.

Washing:

The method according to the invention may also comprise at least one washing step before the calcination step.

Once the solvothermal treatment is over, the resulting mixture (mixed oxide in amorphous form) advantageously appearing in the form of a paste, may be possibly washed to separate the mixed oxide from undesired byproducts.

The washing step is preferably performed with distilled water. The washing may be performed by successive centrifugation steps until the pH of the supernatant solution is in the range from 6 to 7. Such a washing particularly enables to remove residual sulfates, chlorides, and hydroxides which may be present.

At the end of the washing, the mixture is dried, advantageously with air, particularly in a stove advantageously having a temperature of at least 60° C., and lower than 150° C.

Crushing:

The method according to the invention comprises a step of mechanically crushing the amorphous mixed oxide obtained by solvothermal treatment of the titanium and niobium precursors.

The crushing is advantageously performed after the optional washing. However, the crushing is performed prior to the calcination step.

The crushing is generally performed in a crushing mill at a speed in the range from 300 to 500 revolutions per minute, advantageously in the order of 500 revolutions per minute.

The crushing mill may for example be a Retsch-S-100-type centrifugal ball mill.

The crushing step advantageously lasts from 15 to 120 minutes, more advantageously still in the order of 30 minutes.

The crushing particularly enables to homogenize the particle size before the calcination step.

Further, without theorizing, the Applicant has observed that the step of crushing before calcination provides a good electrochemical cycling stability of the titanium and niobium mixed oxide as compared with an oxide synthesized by a solvothermal process with no intermediate crushing.

Calcination:

The calcination of the titanium and niobium mixed oxide is advantageously performed at a temperature in the range from 700 to 1,200° C., and preferably from 700 to 1,000° C.

This step advantageously lasts for from 30 min to 2 hours, more advantageously in the order of one hour.

Further, the heating rate may be in the range from 1 to 5° C./min, advantageously in the order of 3° C./min.

The cooling rate may be in the range from 5 to 20° C./min, advantageously in the order of 10° C./min.

This step promotes the crystallization of the structure of the titanium and niobium mixed oxide. It may be performed under air, just like all the steps of the method according to the invention.

It should be noted that the optimal calcination temperature of the compounds depends on the stoichiometry of the mixed oxide to be synthesized. It cannot be generalized.

Precursors:

The titanium precursor may advantageously be selected from the group comprising titanium oxysulfate ($TiOSO_4$); titanium isopropoxide ($Ti(OCH(CH_3)_2)_4$); titanium chloride ($TiCl_4$); and titanium butoxide ($Ti(OC_4H_9)_4$).

The niobium precursor advantageously is a niobium V compound, and particularly niobium chloride ($NbCl_5$) or niobium ethoxide, $Nb(OC_2H_5)_5$.

Mixed Oxide—Use:

The present invention also relates to the titanium and niobium mixed oxide obtained according to the above-described method. It may particularly be a mixed oxide having formula $Ti_xNb_{2y}O_{(2x+5y)}$ (or $x\ TiO_2 + y\ Nb_2O_5$), x being in the range from 1 to 2 and y being in the range from 1 to 12, where x and y are not necessarily integers, even though they are preferably integers.

According to a specific embodiment, the mixed oxide is $TiNb_2O_7$, x=1 and y=1.

According to another specific embodiment, the mixed oxide is $Ti_2Nb_{10}O_{29}$, x=2 and y=5.

The method of the invention enables to increase the specific surface of the mixed oxide as compared with prior art methods. This may thus generate a modification of the specific capacity of the material.

Thus, the specific surface of the mixed oxide of the present invention is advantageously in the range from 1 $m^2/g$ to 50 $m^2/g$, more advantageously still from 5 to 45 $m^2/g$.

It may appear in the form of particles having a size advantageously smaller than one micrometer. However, such particles may form clusters of some ten micrometers.

Particularly, the crushing before calcination enables to provide a specific particle size distribution for the mixed oxide of the invention, with a double population: on the one hand, a first population made of so-called primary particles having a mean diameter in the range from 0.2 to 1 micrometer, centered on 0.4 micrometer and, on the other hand, a second population made of the clusters of primary particles, said clusters having a mean diameter in the range from 4 to 14 micrometers, centered on 10 micrometers.

Conversely, with no crushing step, the particle size distribution appears to be dispersed.

This lithium oxide may be used in the manufacturing of electrodes, particularly electrodes intended for lithium accumulators.

Due to its properties, and as compared with prior art compounds, the titanium and niobium mixed oxide of the invention may be used in applications requiring more energy.

For example, $TiNb_2O_7$ and $Ti_2Nb_{10}O_{29}$ compounds have theoretical capacities of 388 mAh/g and 396 mAh/g, respectively, while the $Li_4Ti_5O_{12}$ compound currently used in prior art lithium accumulators has a theoretical capacity of 175 mAh/g.

Further, the working potential of compounds $TiNb_2O_7$ and $Ti_2Nb_{10}O_{29}$ is close to that of $Li_4Ti_5O_{12}$, which enables them to keep the advantages thereof in terms of safety.

Electrode-Lithium Accumulator:

An electrode comprising the titanium and niobium mixed oxide of the invention and the lithium accumulator containing at least one electrode of this type also form part of the invention.

The titanium and niobium mixed oxide of the invention can thus be used in this type of structure as a $Li^+$ ion insertion material.

Lithium accumulator particularly means:
- a metal lithium accumulator comprising a negative electrode having metal lithium as an active material and a positive electrode containing an insertion material; or
- a Li-ion accumulator where lithium remains in the state of $Li^+$ ions. Generally, the positive and negative electrodes of this type of accumulator each contain an insertion material.

Generally, a lithium accumulator comprises at least one positive electrode and at least one negative electrode. Electrodes of opposite signs are separated by an electrode separator which is impregnated with electrolyte (ion conductor).

Electrodes which do not have metal lithium as an active material may be prepared according to prior art techniques belonging to the general knowledge of those skilled in the art, and particularly based on an ink comprising at least one active electrode material, and possible an electron conductor, and a binder.

The electrodes can thus be deposited on metal sheets (aluminum, for example) used as current collectors.

The binder enables to provide a good ion conduction and a satisfactory mechanical behavior. It may particularly be at least one compound selected from the group comprising polyethers; polyesters; carboxymethylcellulose; polymers based on at least one monomer, such as methyl methacrylate, acrylonitrile, or vinylidene fluoride.

The electron conductor enables to facilitate the transfer of the current from the electrode to the current collector. It may be nanometer-range carbon such as Super P® or VGCF ("Vapor grown carbon fiber"), for example.

As already mentioned, the lithium accumulator comprises an electrode separator impregnated with electrolyte (ion conductor). The electrolyte is a $Li^+$ ion conductor, it enables $Li^+$ cations to migrate from one electrode to the other. It advantageously contains a salt having its cation at least partly made of lithium and an aprotic polar solvent. It may for example be made of a lithium salt comprising $Li^+$ cations such as $LiClO_4$, $LiAsF_6$, $LiPF_6$, $LiBF_4$, $LiRFSO_3$, $LiCH_3SO_3$, $LiN(RFSO_2)_2$, $LiC(RFSO_2)_3$, LiTFSI (lithium trifluoromethane sulphonylimide), LiBOB (bis(oxalato)borate), LiBETI (lithium bis (perfluoroethylsulfonyl)imide).

In these formulas, the RF group advantageously is a fluorine atom or a perfluoroalkyl group capable of comprising from one to eight carbon atoms.

The lithium salt is preferably dissolved in an aprotic polar solvent (for example, ethylene carbonate, propylene carbonate, dimethyl carbonate, diethyl carbonate, or ethylmethyl carbonate . . . ) and supported by the separator arranged between two electrodes of opposite signs of the lithium accumulator.

The electrolyte may also be based on a polymer. In this case, the lithium salt is not dissolved in an organic solvent, but in a solid polymer composite such as, particularly, POE (polyethylene oxide), PAN (polyacrylonitrile), PMMA (polymethyl methacrylate), PDvF (polyvinylidene fluoride) or a derivative thereof.

As already indicated, the lithium accumulator of the invention may be a metal lithium accumulator or a Li-ion accumulator.

According to a specific embodiment, it is a Li-ion accumulator having the above-described titanium and niobium mixed oxide as the active material of its negative electrode. The negative electrode may be mainly made of the titanium and niobium mixed oxide.

In this case, the positive electrode may be made of any type of known material which may be a lithium source for the negative electrode. The electrode material can thus initially supply the $Li^+$ ions and reinsert them afterwards. For example, the positive electrode may be made of a lamellar $Li_{1+v}Ni_xMn_yCo_zO_2$ material with $x+y+z+v=1$; of a $LiNi_uMn_{2-u}O_4$ spinel-type material with $0<u<1$; or also of a material of $LiMPO_4$ phosphate type with M=Fe, Mn, Co, Ni.

Thus, in a Li-ion accumulator, lithium is never in metal form but in the form of $Li^+$ cations which travel back and forth between the two lithium insertion materials of the negative and positive electrodes, for each charge and discharge of the accumulator.

In the case of a metal lithium accumulator, the negative electrode is made of metal lithium while the active material of the positive electrode may comprise the titanium and niobium metal oxide of the invention.

The invention and the resulting advantages will better appear from the following non-limiting drawings and examples, provided as an illustration of the invention.

DESCRIPTION OF THE DRAWINGS

FIG. 1a shows a photograph obtained by scanning electron microscopy of the $TiNb_2O_7$ material (calcination at 750° C.).

FIG. 1b shows a photograph obtained by scanning electron microscopy of the $TiNb_2O_7$ material obtained according to the method of the invention (mechanical crushing and calcination at 750° C.).

FIG. 1c shows the graph corresponding to the volume percent according to the diameter of the particles of the $TiNb_2O_7$ material (with or without mechanical crushing; calcination at 750° C.).

FIG. 2a shows a photograph obtained by scanning electron microscopy of $Ti_2Nb_{10}O_{29}$ obtained according to the method of the invention (calcination at 950° C.).

FIG. 2b shows a photograph obtained by scanning electron microscopy of $Ti_2Nb_{10}O_{29}$ obtained according to the method of the invention (mechanical crushing and calcination at 950° C.).

DETAILED DESCRIPTION OF THE INVENTION

Example 1

Synthesis of $TiNb_2O_7$ According to the Method of the Invention (FIGS. 1a and 1b)

$NbCl_5$ (3.13 g) is dissolved in 10 mL of anhydrous ethanol under an argon atmosphere and under mechanical stirring. The solution is transferred under air.

Titanium oxysulfate ($TiOSO_4$) (6.17 g) at 15% by mass in sulfuric acid is added to this solution.

Then, 10 mL of ethanol are added to dissolve the precursors, all this under magnetic stirring.

The pH of the solution is adjusted to 10 by slow addition of ammonia at 28% by mass in water.

The paste thus obtained is transferred into a Teflon® container having a 90-mL capacity, placed in the corresponding autoclave which is then heated up to 220° C. for 5 hours with a heating and cooling ramp of 2 and 5° C./min, respectively.

The paste is then washed with distilled water by centrifugation until a pH between 6 and 7 is obtained.

The compound is heated up to 60° C. for 12 hours and then mechanically crushed for 30 min at 500 rpm in hexane.

After evaporation of the solvent, the powder is calcinated at 750° C. for 1 hour with a heating/cooling ramp of 3° C./min to crystallize $TiNb_2O_7$.

The specific surface of the material after thermal, crushing, and calcination treatment as well as the outlook of the material are disclosed in Table 1 and FIG. 1 (samples 2, 4, 6).

This material is compared with the same material which has not been submitted to a crushing treatment (samples 1, 3, 5).

Example 2

Synthesis of $Ti_2Nb_{10}O_{29}$ According to the Method of the Invention (FIGS. 2a and 2b)

$NbCl_5$ (3.63 g) is dissolved in 10 mL of anhydrous ethanol under an argon atmosphere and under mechanical stirring. The solution is transferred under air.

2.865 g of titanium oxysulfate ($TiOSO_4$) at 15% by mass in sulphuric acid is added to this solution.

Then, 10 mL of ethanol are added to dissolve the precursors, all this under magnetic stirring.

The pH of the solution is adjusted to 10 by slow addition of ammonia at 28% by mass in water.

The paste is transferred into a Teflon container having a 90-mL capacity, placed in the corresponding autoclave, which is then heated up to 220° C. for 5 hours with a heating and cooling ramp of 2 and 5° C./min, respectively.

The paste is then washed with distilled water by centrifugation until a pH between 6 and 7 is obtained.

The compound is heated up to 60° C. for 12 hours and then mechanically crushed for 30 min at 500 rpm in hexane.

After evaporation of the solvent, the powder is calcinated at 950° C. for 1 hour with a heating/cooling ramp of 3° C./min to crystallize the $Ti_2Nb_{10}O_{29}$.

The specific surface of the material after thermal, crushing, and calcination treatment as well as the outlook of the material are disclosed in Table 2 and FIG. 2 (samples 8, 10, 12).

This material is compared with the same material which has not been submitted to a crushing treatment (samples 7, 9, 11).

Example 3

Figure 3A:
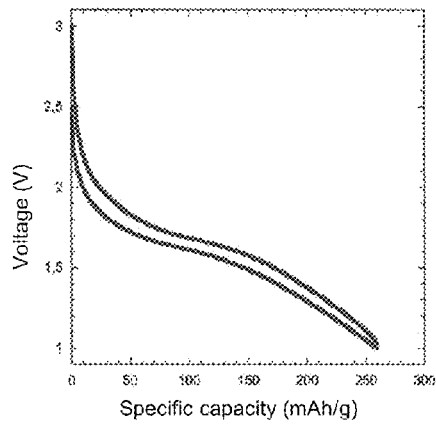
FIG. 3a shows a graph corresponding to the specific capacity at C/10 of a $TiNb_2O_7$ material obtained according to the method of the invention (calcination at 750° C.), according to the voltage.
Figure 3B:
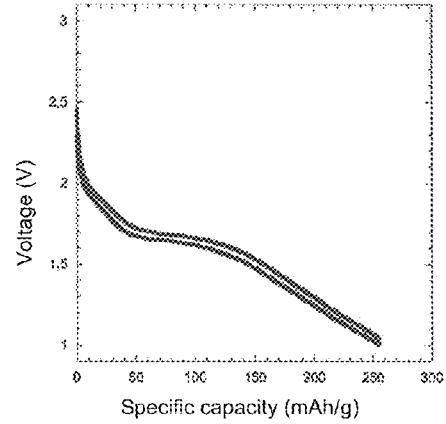
FIG. 3b shows a graph corresponding to the specific capacity at C/10 of a $Ti_2Nb_{10}O_{29}$ material obtained according to the method of the invention (calcination at 950° C.), according to the voltage.
Figure 4A:
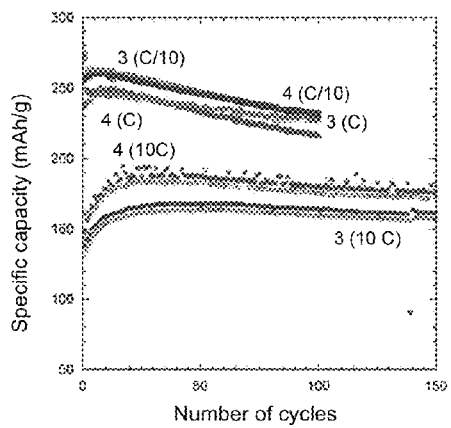
FIG. 4a illustrates a graph corresponding to the variation of the specific capacity according to the number of cycles at variable rate (C/10, C, and 10C) between 3.0 and 1.0 V for the $TiNb_2O_7$ material obtained according to the method of the invention (calcination at 750° C.) with or without crushing.
Figure 4B:
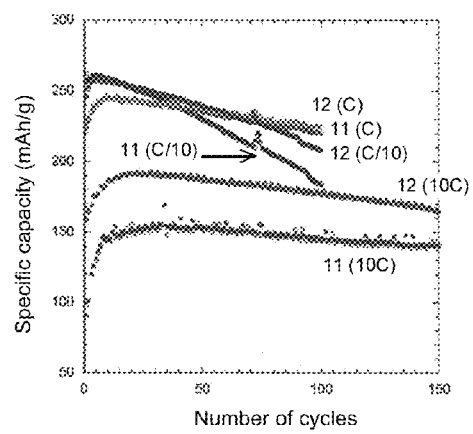
FIG. 4b illustrates a graph corresponding to the variation of the specific capacity according to the number of cycles at variable rate (C/10, C, and 10C) between 3.0 and 1.0 V for the $Ti_2Nb_{10}O_{29}$ material obtained according to the method of the invention (calcination at 950° C.) with or without crushing.
Figure 5A:
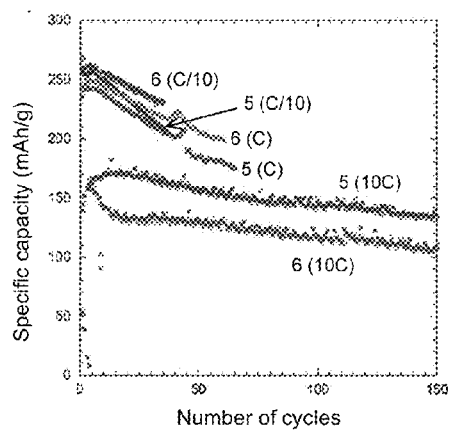
FIG. 5a illustrates a graph corresponding to the variation of the specific capacity according to the number of cycles at variable rate (C/10, C, and 10C) between 3.0 and 1.0 V for the $TiNb_2O_7$ material obtained according to the method of the invention (with or without crushing, calcination at 950° C.).
Figure 5B:
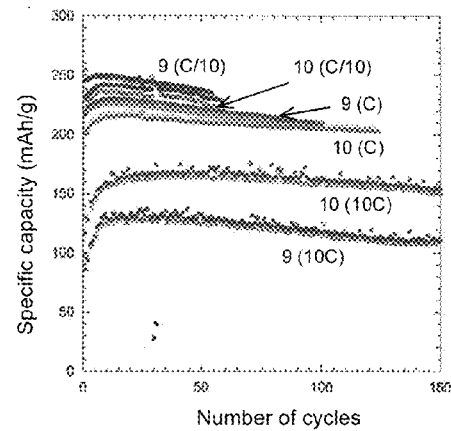
FIG. 5b illustrates a graph corresponding to the variation of the specific capacity according to the number of cycles at variable rate (C/10, C, and 10C) between 3.0 and 1.0 V for the $Ti_2Nb_{10}O_{29}$ material obtained according to the method of the invention (with or without crushing, calcination at 750° C.).

Metal Lithium Accumulator Comprising the Materials of Examples 1 and 2 (FIGS. 3 to 5)

A metal lithium accumulator of "button cell" format is prepared by assembly of the following elements:
- a negative lithium electrode (16-mm diameter, 130-micrometer thickness) deposited on a nickel disk used as a current collector;
- a positive electrode formed of a disk having a 14-mm diameter sampled from a composite film having a 25-micrometer thickness comprising the materials of the invention prepared according to examples 1 and 2 (80% by mass), Super P carbon (10% by mass) as an electron conductor, and polyvinylidene fluoride (10% by mass) as a binder, all being deposited on an aluminum current collector (sheet having a 20-micrometer thickness);
- a separator impregnated with a liquid electrolyte based on the $LiPF_6$ salt (1 mol/L) dissolved in a mixture of ethyl carbonate, propylene carbonate, and dimethyl carbonate.

The electrochemical performance of accumulators thus prepared with the materials described in examples 1 and 2 are illustrated in FIGS. 3 to 5.

They are also compared with those of accumulators prepared with the materials of examples 1 and 2 which have not been calcinated.

TABLE 1

Effect of the different synthesis steps on the specific surface of the $TiNb_2O_7$ mixed oxide of example 1.

| | Sample | | | | | |
|---|---|---|---|---|---|---|
| | 1 | 2 | 3 (FIG. 1c FIG. 4a) | 4 (FIG. 1c FIG. 4a) | 5 (FIG. 5a) | 6 (FIG. 5a) |
| Solvothermal treatment | Yes | Yes | Yes | Yes | Yes | Yes |

TABLE 1-continued

Effect of the different synthesis steps on the specific surface of the TiNb$_2$O$_7$ mixed oxide of example 1.

| | Sample | | | | | |
|---|---|---|---|---|---|---|
| | 1 | 2 | 3 (FIG. 1c FIG. 4a) | 4 (FIG. 1c FIG. 4a) | 5 (FIG. 5a) | 6 (FIG. 5a) |
| Mechanical crushing | No | Yes | No | Yes | No | Yes |
| Calcination (° C.) | No | No | 750 | 750 | 950 | 950 |
| Specific surface (m$^2$/g) | 238 | 170 | 44 | 31 | 11 | 9 |

TABLE 2

Effect of the different synthesis steps on the specific surface of the Ti$_2$Nb$_{10}$O$_{29}$ mixed oxide of example 2.

| | Sample | | | | | |
|---|---|---|---|---|---|---|
| | 7 | 8 | 9 (FIG. 5b) | 10 (FIG. 5b) | 11 (FIG. 4b) | 12 (FIG. 4b) |
| Solvothermal treatment | Yes | Yes | Yes | Yes | Yes | Yes |
| Mechanical crushing | No | Yes | No | Yes | No | Yes |
| Calcination (° C.) | No | No | 750 | 750 | 950 | 950 |
| Specific surface (m$^2$/g) | 183 | 131 | 18 | 14 | 6.3 | 4.9 |

Figure 6A:
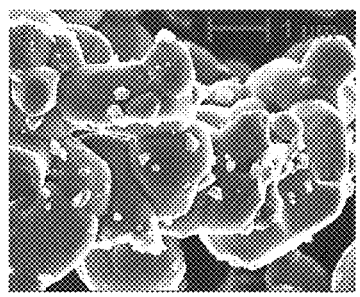
FIG. 6a shows a photograph obtained by scanning electron microscopy of a $TiNb_2O_7$ material obtained by a solid process according to prior art.
Figure 6B:
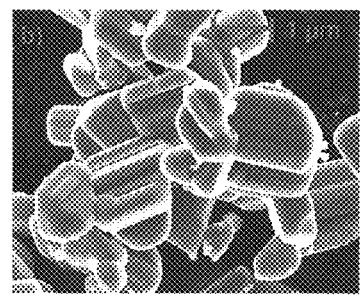
FIG. 6b shows a photograph obtained by scanning electron microscopy of a $Ti_2Nb_{10}O_{29}$ material obtained by a solid process according to prior art.

Counter Examples CE1 and CE2 (FIG. 6)

The TiNb$_2$O$_7$ (CE1) and Ti$_2$Nb$_{10}$O$_{29}$ (CE2) oxides have been prepared by a solid process according to prior art by mechanical crushing of the respective titanium and niobium oxides, followed by a calcination at 1,150° C. for 24 hours.

The values of the specific surface of each of these materials are gathered in table 3.

TABLE 3

Specific surface of the TiNb$_2$O$_7$ and Ti$_2$Nb$_{10}$O$_{29}$ compounds of prior art.

| Sample | CE1 (TiNb$_2$O$_7$) (FIG. 6a) | CE2 (Ti$_2$Nb$_{10}$O$_{29}$) (FIG. 6b) |
|---|---|---|
| Calcination (° C.) | 1,150 | 1,150 |
| Specific surface (m$^2$/g) | 0.49 | 0.98 |

The invention claimed is:

1. A method of preparing a titanium and niobium mixed oxide comprising the steps of:
preparing a titanium and niobium mixed oxide in amorphous form by a solvothermal treatment of at least one titanium precursor and of at least one niobium precursor;
mechanically crushing the titanium and niobium mixed oxide obtained at the end of the solvothermal treatment; and
calcinating the mixed oxide obtained after crushing.

2. The method of preparing a titanium and niobium mixed oxide of claim 1, wherein the solvothermal treatment of the titanium and niobium precursors is performed at a temperature in the range from 200 to 250° C.

3. The method of preparing a titanium and niobium mixed oxide of claim 1, wherein the mixed oxide in amorphous form is washed prior to the calcination step.

4. The method of preparing a titanium and niobium mixed oxide of claim 1, wherein the calcination step is carried out at a temperature in the range from 700 to 1,200° C.

5. The method of preparing a titanium and niobium mixed oxide of claim 1, wherein the titanium precursor is selected from the group comprising titanium oxysulfate (TiOSO$_4$); titanium isopropoxide (Ti(OCH(CH$_3$)$_2$)$_4$); titanium chloride (TiCl$_4$); titanium butoxide (Ti(OC$_4$H$_9$)$_4$).

6. The method of preparing a titanium and niobium mixed oxide of claim 1, wherein the niobium precursor is selected from the group comprising niobium chloride (NbCl$_5$); niobium ethoxide, Nb(OC$_2$H$_5$)$_5$.

7. A titanium and niobium mixed oxide obtained according to the method of claim 1, wherein the mixed oxide has a specific surface in the range from 5 m$^2$/g to 45 m$^2$/g.

8. The titanium and niobium mixed oxide of claim 7, wherein the mixed oxide has formula Ti$_x$Nb$_{2y}$O$_{(2x+5y)}$, wherein x is in the range from 1 to 2 and y is in the range from 1 to 12.

9. An electrode having its active material comprising at least one titanium and niobium mixed oxide of claim 7.

10. A negative electrode having its active material comprising at least one titanium and niobium mixed oxide of claim 7.

11. A lithium accumulator containing at least one electrode having its active material comprising at least one titanium and niobium mixed oxide of claim 7.

12. A titanium and niobium mixed oxide obtained according to the method of claim 2, wherein the mixed oxide has a specific surface in the range from 5 m$^2$/g to 45 m$^2$/g.

13. A titanium and niobium mixed oxide obtained according to the method of claim 3, wherein the mixed oxide has a specific surface in the range from 5 m$^2$/g to 45 m$^2$/g.

14. A titanium and niobium mixed oxide obtained according to the method of claim 4, wherein the mixed oxide has a specific surface in the range from 5 m$^2$/g to 45 m$^2$/g.

15. A titanium and niobium mixed oxide obtained according to the method of claim 5, wherein the mixed oxide has a specific surface in the range from 5 m$^2$/g to 45 m$^2$/g.

16. A titanium and niobium mixed oxide obtained according to the method of claim 6, wherein the mixed oxide has a specific surface in the range from 5 m$^2$/g to 45 m$^2$/g.

* * * * *